United States Patent Office 2,904,471
Patented Sept. 15, 1959

2,904,471

STABILIZED AND REACTIVATED ACTH PREPARATIONS AND PROCESSES OF PRODUCING THE SAME

Frederick A. Kuehl, Jr., Rumson, N.J., assignor to Merck & Co., Inc., Rahway, N.J., a corporation of New Jersey No Drawing. Continuation of application Serial No. 278,127, March 22, 1952. This application December 3, 1956, Serial No. 625,578

10 Claims. (Cl. 167—74)

This invention is concerned generally with the stabilization of substances having the activity of the adrenocorticotropic hormone, and with processes for restoring the activity of inactivated ACTH preparations. More particularly, it relates to solutions containing ACTH-active substances, said solutions being rendered stable against losses in ACTH activity on standing by the addition thereto of a mild reducing agent, and with processes for reactivating inactivated ACTH preparations by treating the latter with a mild reducing agent.

This application is a continuation of my copending application Serial No. 278,127, filed March 22, 1952, now abandoned.

When pituitary gland extracts are processed to produce substances having the activity of the adrenocorticotropic hormone, it has been observed that, while in solution, such ACTH-active extracts, as well as concentrates and hydrolysis products thereof are very susceptible to inactivation. In the isolation and purification of ACTH-active substances, which operations ordinarily involve the steps of precipitating active substances or undesired impurities, extractions, as well as adsorption-elution and chromatographic procedures, the ACTH-active substances must necessarily remain in solution for considerable periods of time. Thus, the isolation and purification of ACTH-active substances has heretofore resulted in extensive inactivation of the ACTH-active substances originally present in the pituitary extract. This inactivation is extremely wasteful of valuable material and, at the same time, places a serious obstacle in the path of obtaining substantially pure products having maximum ACTH activity. Moreover, it has been found that such inactivation of ACTH-active substances in solution occurs with particular readiness in the case of products having relatively high ACTH activity, and that the resultant decrease in ACTH activity is the greater, the more active the ACTH preparation. In fact, solutions containing purified ACTH products having an ACTH activity in excess of about 60 times the activity of "Armour Standard La-1-A" (a standardized corticotropin product made by Armour & Co.) deteriorate so rapidly that, even in the ordinary course of processing such solutions, the fraction of the original ACTH-active substances inactivated may be as great as 50%.

I have now discovered, surprisingly enough, that the inactivation of ACTH-active substances while in solution can be substantially prevented by the addition to said solution of a mild reducing agent. The reducing agent must, of course, have no adverse affect on the ACTH-active substances and I have found that these mild reducing agents can be characterized as reducing organic disulfides to the corresponding sulfhydryl compounds. Examples of these mild reducing agents are hydrogen cyanide, sulfur-containing reducing agents such as hydrogen sulfide, sodium sulfite, sodium thiosulfite, sodium hydrosulfite, thioglycollic acid, cysteine, thiodiglycol, and the like. I ordinarily prefer to utilize hydrogen sulfide as the mild reducing agent in acidic solution, and sodium sulfite in neutral or alkaline solution.

Moreover, I have found that these mild reducing agents, in addition to rendering solutions of ACTH-active substances substantially stable against losses in ACTH activity on standing, will actually reactivate inactivated ACTH preparations. Thus, when a solution containing ACTH-active substances is allowed to stand until a portion or all of the ACTH-active material has been inactivated, and the resulting solution is reacted with a mild reducing agent characterized as reducing organic disulfides to the corresponding sulfhydryl compound, the original activity of the ACTH-active substances is substantially restored.

The following examples illustrate methods of carrying out the present invention, but it is to be understood that these examples are given for purposes of illustration and not of limitation.

*Example 1*

Twenty-five grams of granular Amberlite IRC-50 (a cation exchange resin deriving its exchange capacity from carboxyl groups, of the type described in U.S. Patent No. 2,541,420), 20–60 mesh, in its hydrogen form, were stirred in 200 ml. of water, and an aqueous solution containing 0.5 gm. of NaOH was added slowly to the mixture. When the sodium ion had been adsorbed on the resin, the resin was washed with water and placed in a 50 ml. burette. The resin thus treated was about 15% in the sodium form, the remainder being in the hydrogen form. The resin column was filled with water substantially saturated with hydrogen sulfide.

An ACTH-active concentrate derived from pituitary gland by procedures including purification with oxycellulose and subsequent pepsin digestion, was assayed by the method of Sayers et al. as modified by Munson, Endocrinology 42, 379 (1949) and found to be about eighty to one hundred times as active as Armour Standard La-1-A. Three hundred milligrams of this concentrate were' dissolved in 10 ml. of water substantially saturated with hydrogen sulfide. This solution was passed downwardly through the resin column, over a period of about one and one-half hours. The column was then washed with 50 ml. of water substantially saturated with hydrogen sulfide, downwardly at a rate of about 1 ml. per minute. Over a period of about three hours, the column was washed, first with 250 ml. of a 10% aqueous solution of pyridine containing about 125 mg. of sodium sulfite, and then with 500 ml. of a 10% aqueous solution of acetic acid substantially saturated with hydrogen sulfide.

Through the column downwardly was then passed 200 ml. of an aqueous solution of hydrochloric acid at pH 2, and at a rate of 100 ml. per hour, followed by 200 ml. of an aqueous solution of hydrochloric acid at pH 1.58, at the same rate. Both solutions were substantially saturated with hydrogen sulfide. Two corresponding eluate fractions were collected, adjusted to pH 2.5–3 by the addition of an anion-exchange resin (Amberlite IRA-400) in its carbonate form, filtered, and the resulting eluates evaporated separately from the frozen state, in vacuo. The first eluate, upon evaporation, gave 60 mg. of polypeptide composition and the second 40 mg. of polypeptide composition. Both polypeptide products were obtained as amorphous white powders in the form of the hydrochloric acid addition salts. Assay of these two products, utilizing the assay method of Sayers et al. referred to hereinabove, showed that each of these polypeptides possessed about 300 times the ACTH activity possessed by Armour Standard La-1-A.

In the foregoing experiment, wherever the ACTH-active substances were present in solution, there was likewise incorporated in the solution the mild reducing agent, hydrogen sulfide. Thus, inactivation of the ACTH-active substances was substantially prevented and there was obtained a product having a higher ACTH activity than any ACTH product previously reported.

*Example 2*

Two purifications of adenocorticotropic hormonally-active concentrates were carried out, one in the absence of and the other in the presence of a mild reducing agent, as follows:

A. One hundred milligrams of an ACTH-active concentrate which had about seventy times the ACTH activity of Armour Standard La–1–A (as shown by assay using the assay method of Sayers et al. as set forth in Example 1 hereinabove) was purified with oxycellulose (about 10–20% free carboxyl), substantially as described by Astwood et al. J.A.C.S. 73, 2969 (1951). When the contents of the hydrochloric acid eluate fractions were assayed (using the Sayers et al. method), it was found that the fractions of highest activity yielded products whose activity was no higher than that possessed by the starting material.

B. Four hundred milligrams of ACTH-active concentrate substantially identical with that treated in A hereinabove and having about seventy times the ACTH activity of Armour Standard La–1–A was purified in the same manner as described in A except that feed, wash and eluant solutions were all substantially saturated with hydrogen sulfide. When the contents of the hydrochloric acid eluate fractions were assayed (using the Sayers et al. method), it was found that the fractions of highest activity yielded products whose activities were about one hundred and seventy times that of Armour Standard La–1–A.

From the foregoing, it is clear that in experiment A, approximately one-half of the ACTH-active material was inactivated whereas in experiment B the mild reducing agent, hydrogen sulfide, rendered the solutions of ACTH-active substances substantially stable and made possible the obtainment of an ACTH-active product having over twice the ACTH activity of the starting material.

*Example 3*

Three purifications of adrenocorticotropic hormonally-active concentrates were carried out, the first of which was conducted in the absence of and the latter two in the presence of a mild reducing agent:

C. A solution of 200 mg. of a concentrate (hydrochloric acid addition salt) which had about five times the ACTH activity of Armour Standard La–1–A, in 4 ml. of methanol, was treated with a small excess of triethylamine acetate. The precipitate that formed was washed with ethanol and then ether, and dried. The resulting product was dissolved and 6 ml. of methanol containing six drops of 1.0 N HCl, ether was added, and the precipitate which formed was recovered and dried. This product was assayed by the method of Sayers et al. referred to in Example 1 hereinabove and found to be about four times as active as Armour Standard La–1–A.

D. Ninety milligrams of a concentrate, which was about four times as active as Armour Standard La–1–A, was treated as in "C" hereinabove, except that all solutions contained one drop of a 37% aqueous solution of thioglycollic acid per milliliter. The product thus obtained had about nine times the ACTH activity of Armour Standard La–1–A.

E. A concentrate, which had about seven times the ACTH activity of Armour Standard La–1–A, was treated as in "D." The product had about eleven times the ACTH activity of Armour Standard La–1–A.

The latter product was administered to a patient with rheumatoid arthritis. Two and one-half milligrams was administered on the first day, and one milligram was administered daily (in ¼ mg. doses every 6 hours) on each of the following four days. Excellent remission of the arthritis resulted, and the sedimentation rate dropped from 50 to 3.

*Example 4*

A solution of ACTH-active material was allowed to stand in contact with air until the major part of the ACTH-active material had been inactivated; the inactivated product was then treated with a mild reducing agent whereby the original ACTH-activity of the original material was substantially restored, as follows:

F. Nineteen milligrams of an ACTH-active concentrate, which was shown by the assay method of Sayers et al., referred to in Example 1 hereinabove to possess about eight times the ACTH-activity of Armour Standard La–1–A, was dissolved in 10 ml. of water containing a trace of ferric chloride, and the solution was adjusted to pH 7 by the addition of a dilute aqueous solution of potassium hydroxide. The resulting solution was maintained in intimate contact with air for a period of about sixteen hours, after which the pH of the solution was adjusted to 3 by the addition of a dilute aqueous solution of hydrochloric acid. The resulting acidic solution was evaporated to dryness in vacuo, and the residual material was dissolved in about 1 ml. of methanol, inorganic material was removed by centrifugation, and the active product was precipitated by the addition of ether. The precipitated material was recovered and dried to give 18 mg. of product which was found by assay to possess about twice the ACTH activity of Armour Standard La–1–A.

G. Thirteen milligrams of this product, in which the major portion of ACTH-active substances had been inactivated, was dissolved in 3 ml. of water, and hydrogen sulfide gas was bubbled through the solution for a period of about two hours. The resulting solution, substantially saturated with hydrogen sulfide, was then allowed to stand at a temperature of approximately 5° C. for a period of about three days. A trace of precipitated material was removed by centrifugation, the solution was evaporated to dryness in vacuo, and the residual material was dissolved in methanol. Ether was added to the methanol solution, and the product which precipitated was recovered by filtration and dried to give 11 mg. of an ACTH-active product which was found by assay to possess about seven times the ACTH activity of Armour Standard La–1–A.

From the foregoing, it is clear that inactivation of the major part of the ACTH-active substances occurred in experiment "F," and that the original activity of the ACTH-active substances was substantially restored by reacting the inactivated material with the mild reducing agent, hydrogen sulfide, in experiment "G."

Various changes and modifications may be made in carrying out the present invention without departing from the spirit and scope thereof. Insofar as these changes and modifications are within the purview of the annexed claims, they are to be considered as part of my invention.

I claim:

1. A solution containing normally unstable adrenocorticotropic hormonally active polypeptides and a mild reducing agent of such mildness as to have no deleterious effect on the polypeptides and characterized as reducing organic disulfides to the corresponding sulfhydryl compounds, said reducing agent being present in such concentrations so as to prevent loss in adrenocorticotropic hormone activity.

2. A solution containing normally unstable adrenocorticotropic hormonally active polypeptides, and a mild reducing agent of such mildness as to have no deleterious effect on the polypeptides and characterized as reducing organic disulfides to the corresponding sulfhydryl compounds, said reducing agent being present in such concentrations so as to prevent loss in adrenocorticotropic hormone activity.

3. A solution, substantially saturated with hydrogen sulfide, and containing normally unstable adrenocorticotropic hormonally active polypeptide, the solution being substantially stable against losses in adrenocorticotropic hormone activity.

4. A solution containing normally unstable adrenocorticotropic hormonally active polypeptides and thioglycollic acid, the solution being substantially stable against losses in adrenocorticotropic hormone activity.

5. A process for reactivating and reducing loss of activity of normally unstable adrenocorticotropic hormonally active polypeptides which comprises contacting the polypeptides in solution with a mild reducing agent of such mildness as to have no deleterious effect on the substance.

6. A process for reactivating and reducing loss of activity of normally unstable adrenocorticotropic hormonally active polypeptides which comprises contacting the polypeptides in solution with a mild reducing agent of such mildness as to have no deleterious effect on the polypeptides and characterized as reducing organic disulfides to the corresponding sulfhydryl compounds, said reducing agent being present in such concentrations so as to prevent loss in adrenocorticotropic hormone activity and characterized as reducing organic disulfides to the corresponding sulfhydryl compounds said reducing agent being present in such concentrations so as to prevent loss in adrenocorticotropic hormone activity.

7. A process of reactivating and reducing loss of activity of normally unstable adrenocorticotropic hormonally active polypeptides which comprises contacting the polypeptides in solution with hydrogen sulfide.

8. A process of reactivating and reducing loss of activity of normally unstable adrenocorticotropic hormonally active polypeptides which comprises contacting the polypeptides in solution with thioglycollic acid.

9. A process of preparing normally unstable adrenocorticotropic hormonally active polypeptides from inactivated adrenocorticotropic hormone polypeptides, which have been rendered partially inactive by the action of air on an aqueous solution of the polypeptides, which comprises reacting the partially inactivated polypeptides in an aqueous solution with a mild reducing agent of such mildness as to have no deleterious effect on the polypeptides and characterized as reducing organic disulfides to the corresponding sulfhydryl compounds said reducing agent being present in such concentrations so as to prevent loss in adrenocorticotropic hormone activity.

10. In the process of recovering normally unstable adrenocorticotropic hormonally active polypeptides wherein the adrenocorticotropic hormonally active polypeptides remain in contact with a liquid, which is a solvent for the polypeptides the improvement which comprises incorporating in the liquid a mild reducing agent of such mildness as to have no deleterious effect on the polypeptides and characterized as reduced organic disulfides to the corresponding sulfhydryl compounds, said reducing agent being present in such concentrations so as to prevent loss in adrenocorticotropic hormone activity.

References Cited in the file of this patent

UNITED STATES PATENTS 2,190,183   Friederich _____ Feb. 13, 1940

OTHER REFERENCES

Ralli: Adrenal Cortex, 1950, pp. 34 and 35.

White et al.: Procs. Soc. Exptl. Biol. and Med., vol. 78, No. 2, November 1951, pp. 616–619, part. p. 616.

Harris et al.: Federation Proceedings, vol. 10, No. 1, Part. 1, March 1951, p. 195.

Dixon et al.: Nature, vol. 168, No. 4285, December 15, 1951, pp. 1044 and 1045.

Selye: Textbook of Endocrinology, 1947, p. 215.

Goddard et al.: J. Biolog. Chem., vol. 106, 1935, pp. 605–614. U.S. Dispensatory, 24th ed., 1947, p. 1588.